United States Patent [19]

Jackson et al.

[11] Patent Number: 4,946,928

[45] Date of Patent: Aug. 7, 1990

[54] CURABLE RESIN FROM CYANATE AROMATIC ESTER AND PROPARGYL AROMATIC ETHER

[75] Inventors: Roy J. Jackson; Anthony M. Pigneri, both of Houston, Tex.

[73] Assignee: Shell Oil Company, Houston, Tex.

[21] Appl. No.: 310,127

[22] Filed: Feb. 15, 1989

[51] Int. Cl.$^5$ ............................................. C08G 67/00
[52] U.S. Cl. .................................. 528/205; 428/411.1; 524/612; 525/539; 528/392; 528/422; 528/423
[58] Field of Search ............... 528/205, 392, 422, 423; 525/539

[56] References Cited

U.S. PATENT DOCUMENTS

| | | | |
|---|---|---|---|
| 3,748,305 | 7/1973 | White et al. | 528/205 |
| 4,110,364 | 8/1978 | Gaku et al. | 528/170 |
| 4,554,346 | 11/1985 | Gaku et al. | 528/373 |
| 4,749,760 | 6/1988 | Wang | 525/471 |
| 4,774,282 | 9/1988 | Qureshi | 528/205 |
| 4,777,226 | 10/1988 | Holte | 528/205 |
| 4,861,823 | 8/1989 | Qureshi | 528/205 |

FOREIGN PATENT DOCUMENTS 2825413  1/1980  Fed. Rep. of Germany.
2907195  8/1980  Fed. Rep. of Germany.

Primary Examiner—Harold D. Anderson

[57] ABSTRACT

New curable resin composition comprises a cyanate aromatic ester and a propargyl aromatic ether.

20 Claims, No Drawings

CURABLE RESIN FROM CYANATE AROMATIC ESTER AND PROPARGYL AROMATIC ETHER

FIELD OF THE INVENTION

The present invention relates to curable resins from cyanate aromatic esters and propargyl aromatic ethers.

STATE OF THE ART

A variety of cyanate aromatic ester resins are known in the art for use as matrix resins for fiber reinforced composites, particularly for electrical and electronic applications. For electrical and electronic applications, the cyanate aromatic ester resins are mainly used in combination with various bismaleimide resins. On the other hand, propargyl aromatic ethers are used to make resins but neat cuing of the propargyl ether of bisphenol occurs at a high temperature of about 250° C. and with significant weight loss of about 50% apparently due to decomposition.

SUMMARY OF THE INVENTION

The present invention is directed to a curable resin composition comprising (a) a cyanate aromatic ester monomer, prepolymers thereof, or prepolymers of the ester monomer and an amine; and (b) a propargyl aromatic ether monomer.

The compositions of the invention are useful for composites and the like and can be quite thermally stable and curable at relatively low temperatures to give glass transition temperatures in excess of about 200° C. when fully cured.

The polyfunctional cyanate aromatic ester monomer that can be used in this invention are compounds having at least two cyanate groups, directly attached to ring carbon atoms of an aromatic (aryl) organic group containing 6 to about 100 carbon atoms. Suitable dicyanate aromalic ester monomers include those represented by the formula (1)

  (1)

wherein n is a number of at least 2, and usually not more than about 10, preferably about 5, and R is an aromatic (aryl) organic group containing up to about 100 carbon a(atoms, comprising an aromatic ring or an aromatic ring (a) bonded directly or through a bridging atom or group to or (b) fused to one or more aromatic or cycloaliphatic rings, each aromatic ring of R having from zero to all the available ring positions independently substituted by the cyanate ester group.

Suitable aromatic organic groups for R include (i) residues having a valence of at least 2 and derived from aromatic hydrocarbons containing 6 to 16 carbon atoms, such as benzene, naphthalene, anthracene or pyrene;

(ii) organic grouPs consisting of a plurality of aromatic rings bonded directly or through a bridging atom or group, for example, those expressed by the following formula (2)

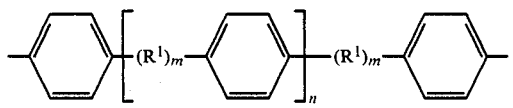  (2)

wherein each m is independently zero or 1, n is zero or 1; and each $R^1$ is an independently divalent aliphatic or aromatic hydrocarbon or aromatic ether group containing up to 14 carbon atoms, an oxygen atom, a sulfur atom, a carbonyl group, a sulfonyl group, a sulfinyl group, an alkylene-oxyalkylene group containing up to 4 carbon atoms in each alkylene group, an imino group,

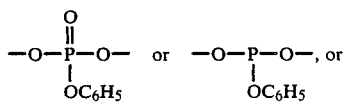

(iii) groups derived from novolac-type phenol or resorcinol resins.

These aromatic organic groups R and $R^1$ can be substituted on their aromatic ring by a substituent which does not participate in the reaction, such as an alkyl group containing 1 to 4 carbon atoms (e.g., methyl or ethyl), alkoxy groups containing 1 to 4 carbon atoms (e.g., methoxy or ethoxy), a halogen atom (e.g., chlorine or bromine), or a nitro group and the like.

Examples of suitable organic groups of the general formula (2) arc those derived from biphenyl, diphenylmethane, $\alpha,\alpha^1$-dimethylphenylmethane, di-(4-hydroxylhenyl)-p-diisopropylbenzene, diphenyl ether, diphenyl dimethylene ether, diphenyl thioether, diphenyl ketone, diphenyl thioether, diphenylamine, diphenyl sulfoxide, diphenyl sulfone, triphenyl phosphite, and triphenyl phosphate and the like.

In the compounds of formula 1, R preferably contains up to about 70 carbon atoms when a novolac resin (iii) or up to about 40 carbon atoms when other than a novolac resin.

Generally, the cyanate aromatic ester monomers can be prepared by known methods including reacting polyhydric phenolic materials with cyanogen halides, such as cyanate aromatic esters, which are readily available and preferred in this invention in view of the properties of the final resin obtained are those prepared by reacting a dihydric phenol, such as bisphenyl A [2,2-bis(4'-hydroxyphenyl)propane]with cyanogen halides. Likewise, cyanate aromatic esters obtained by the reaction of a phenol-formaldehyde precondensate with cyanogen halides can be advantageously used.

The cyanate aromatic ester as component (a) can also be used in the form of a prepolymer. The prepolymer is prepared by polymerizing the cyanate aromatic ester monomer in the presence of a catalyst, for example, a mineral acid, a Lewis acid, a salt such a sodium carbonate or lithium chloride, or a phosphoric acid ester such as tributyl phosphine. The prepolymer contains a triazine ring generally in the molecule as a result of the trimerization of the cyano group of the cyanate aromatic ester. Preferred prepolymers are those having an average molecular weight of at least 400, especially up to 6000.

The cyanate aromatic ester can be used in the form of a mixture of the monomer and the prepolymer. For example, many of the commercially available cyanate aromatic esters derived from bisphenol A and a cyanogen halide are in the form of mixtures of cyanate monomers and prepolymers, and such materials can also be used in the present invention.

A mixture of prepolymers of the cyanate monomer and amine also can be used as the cyanate aromatic ester component.

The cyanate aromatic ester can be used either alone or in admixture of two or more.

Prepolymers of the cyanate aromatic ester and prepolymers of the cyanate aromatic ester and amines can also be used as component (a).

As already stated, an amine can be incorporated in the form of a prepolymer of the cyanate aromatic ester and the amine as component (a). Examples of the amines that can be used in this invention include (i) diamines of the general formula $$H_2N-R^2-NH_2$$

wherein $R^2$ is a divalent aromatic or alicyclic organic group, and (ii) polyamines containing up to about 24 carbon atoms. It's desirable to use aromatic diamines in view of the thermal stability of the final resins. When it is desired to improve the flexibility or suppleness of the resin, alicyclic diamines may be used alone or in combination with the aromatic diamines. From the viewpoint of reactivity, the diamines are preferably primary diamines, but secondary diamines can also be used. Examples of suitable diamines are m-phenylene diamine, m-, or p-xylylenediamine, 1,4-cyclohexane diamine, hexahydroxylylene diamine, 4,4'-bisaminophenyl methane, 4,4'-bisaminophenyl sulfone, bis(4-amino-3-methylphenyl) methane (MDT), bis(4-amino-3,5-dimethylphenyl)methane (MDX), 4,4'-bis-aminophen),cyclohexane, 4,4'-bisaminophenyl ether, 2,2-bis(4'-aminophenyl)-propane, 2,2-bis(4-amino-3-methylphenyl)methane, and α,α-bis(4-aminophenyl)phenylmethane, α,α-bis(4-aminophenl)-p-diisopropylbenzene and the like. Polyamines suitable for use in the invention includes hexamethylene tetramine, polyethylene imine, polyamino styrene or polyvinyl imidazole; triethylene diamine; imidazoles such as 2-methylimidazole, 2-undecylimidazole, 2-heptade-cylimidazole, 2-phenylimidazole, 2-eihyl-4-methylimidazole, 1-benzyl-2-methylimidazole, 1-propyl-2-methylimidazole, 1-cyanoethyl-2-methyl-imidazole, 1-cyanoeihyl-2-ethyl-4-methylimidazole, 1-cyanoethyl-2-undecylimidazole, 1-cyanoethyl-2phenylimidazole or 1-guanaminoethyl-2-methylimidazole, and adducts formed between these imidazoles and trimellitic acid and the like.

When the amines are incorporated in the composition in the form of prepolymers with the cyanate aromatic ester, the prepolymers can be produced by reacting the cyanate aromatic ester monomer with the diamine, preferably using 0.1 to 1 equivalent of the diamine based on the cyanate aromatic ester monomer, in a suitable solvent such as ketones at a temperature of about 0° to 100° C. for 1 minute to 1 hour.

In the case of adding amine in the form of prepolymers, it is of course permissible to cause free amine to be present in the composition.

When the amine is included in component (a) in the form of a prepolymer, they are considered to function mainly as a modifier forf polymer such as a chain extender.

Suitable cyanate aromatic ester components (component a) are disclosed in U.S. Pat. No. 4,110,364, issued Aug. 29, 1978, which is incorporated herein by reference.

The propargyl aromatic ethers useful in the present inventions are compounds having at least two groups directly attached to an aromatic (aryl) organic group. Suitable di- and polyparagyl aromatic ether monomers include those represented by the formula (3)

$$ROCH_2-C\equiv CH)_n (3)$$

wherein n is number of at least from 2 to about 10, preferably about 5, R is an aromatic (aryl) organic group containing up to about 100 carbon atoms comprising an aromatic ring or an aromatic ring (a) bonded directly or through a bridging atom or group to or (b) fused to one or more aromatic or cycloaliphatic rings, each aromatic ring of R having from zero to all the available ring positions independently substituted by propargyl ether groups. Suitable aromatic organic groups for R, include those described above in reference to the cyanate aromatic esters of formula (1).

Generally, the propargyl aromatic ester monomers can be prepared by known methods including reacting a di or polyhydric phenolic material with a propargyl halide, such as chloride or bromide, in an aqueous alkaline solution, such as aqueous sodium hydroxide solution as described in U.S. Pat. No. 4,226,800, the disclosures of which are incorporated by reference. One preferred method is by using propargyl chloride in an aqueous sodium hydroxide and a water-miscible, protic solvent or co-solvent, which is also disclosed and claimed in an earlier filed U.S. Ser. No. 271,133 filed Nov. 14, 1988, the disclosures of which are incorporated by reference. Propargyl aromatic ethers which are readily available and preferred in this invention in view of the properties of the final resin obtained are those prepared by reacting a dihydric phenol, such as bisphenol A with a propargyl chloride or bromide. Likewise proparyl aromatic ethers obtained by the reaction of a phenol-formaldehyde precondensate with a cyanogen chloride or bromide can advantageously be used.

The components of the curable resin composition of this invention can be varied over a wide range. Generally, however, the ratio by weight of component (a) to component (b) is in the range of from about 1:99 to about 99:1, preferably from about 70:30 to about 30:70, and most preferably from about 70:30 to about 40:60. Ratios are conveniently about 50:50. When preparing heat resistant resin having good toughness, from about 10% by weight to about 90% by weight of component (b), preferably about 70% to about 50% by weight, is used on the basis of total weight of components (a) and (b).

The curable composition of this invention comprises a mixture of components and can each be used in any desired form such as solid, solution or dispersion. These components are mixed in solvent or in the absence of a solvent to form the compositions of this invention. For example, the mixing procedure comprises mixing solutions of component (a) and component (b) either separately or together in a suitable inert organic solvent, such as for example, ketones such as methyl ethyl ketone, chlorinated hydrocarbons such as methylene chloride, ethers and the like, and homogenizing the resulting mixed solution at room temperature or at an elevated temperature below the boiling point of the solvents to form a composition in the form of a solution. When homogenizing these solutions at room temperature or at an elevated temperature, some reactions may take place between the constituent elements. So long as the resins components are maintained in the state of solution without gelation, such reactions do not particularly affect the operability of the resulting composition in, for examPle, a bonding, coating, laminating or molding operation.

The curable resin compositions of invention can be used in the above solution form as adhesives, paints vehicles, molding materials to be impregnated in substrates, or laminating materials. In this case the concentration of the resin solid in the solution is determined so that the optimum operability can be obtained according to the desired utility.

The resin compositions of this invention can be used for various purposes in the form of dried powder, pellets, resin-impregnated product or compound. For example, compositions with the individual components uniformly mixed can be obtained by uniformly mixing the resin components in solution, and then removing the solvents from the homogeneous solution at reduced pressure or at an elevated temperature. Alternatively, solids components (a) and (b) are kneaded at room temperature or at an elevated temperature to form a homogenized resin composition.

The curable composition of this invention may be reticulated by heating it alone to form a cured resin having heat resistance. In general, a catalyst may be used in order to promote crosslinking reaction of the components in the composition.

Examples of the catalysts include imidazoles, such as 2-methylimidazole, 2-undecylimidazole, 2-heptadecylimidazole, 2Phenylimidazole, 2-ethyl-4-methylimidazole, 1-benzyl-2-methylimidazole, 1-propyl2-meihylimidazole, 1-cyanoethyl-2-methylimidazole, 1-cyanoethyl-2-ethyl-4-methylimidazole, 1-cyanoethy)-2-undecylimidazole, 1-cyanoethyl-2-phenylimidazole, 1-guanaminoethyl-2-methylimidazole and addition product o: an imidazole and trimellitic acid; tertiary amines, such as diaminobicycloactane, N,N-dimethyl benzylamine, N,N-dimethylaniline, N,N-dimethyltoluidine, N,N-dimethyl-p-anisidine, p-halogeno-N,N-dimethyl-aniline, 2-N-ethylanilino ethanol, tri-n-butylamine, pyridine, quinoline, N-methylmorpholine, triethanolamine, triethylenediamine, N,N,N',N'-tetramethylbutanediamine, N-methylpiperidine; phenols, such as phenol, cresol, xylenol, resorcinol, and phloroglucin; organic metal complexes or salts, such as copper tetrafluoroborate, lead naphthenate, lead stearate, zinc naphthenate, zinc octoate, tin oleate, dibutyl tin maleate, manganese naphthenate, cobalt naphthenate, and acetyl acetone nickel or iron; and inorganic metal complexes or salts, such as molybdenum carbonyl, bis(etriphenylphosphine) palladium 11 chloride tetrakis (triphenylphosphine) palladium 0, bis(1,2-diphenylphosphino)ethane nickel 11 chloride, stannic chloride, zinc chloride and aluminum chloride; peroxides, such as benzoyl peroxide, lauroyl peroxide, octancyl peroxide, acetyl peroxide, para-chloro-benzoyl peroxide and di-t-butyl diperphthalate; acid anhydrides, such as maleic anhydride, phthalic anhydride, iumaric anhydride, pyro-mellitic anhydride, trimellitic anhydride, hexahydrophthalic anhydride, hexahydropyromellitic anhydride and hexahydrotrimellitic anhydride; azo compounds, such as azoisobutylonitrile, 2,2'-azobispropane, m,m'-azoxystyrene, hydrozones, and mixtures thereof. The amount of catalyst varies considerably according to the type of catalyst, the utility or curing conditions. They can, however, be used in catalytic amounts such as, for example, less than 5% by weight of the total composition. Zinc octoate is preferred.

A variety of additives may be added to the curable composition to impart specific properties provided that they do not impair the essential properties of the resulting resin. Examples of the additives include natural or synthetic resins, fibrous reinforcement, fillers, pigments, dyestuffs, thickening agents, wetting agents, lubricants, frame retardants and the like.

The resin composition of this invention can also contain a white pigment such a titanium dioxide, a colored pigment such as yellow lead, carbon black, iron black, molybdenum red, prussian blue, ultramarine, cadmium yellow or cadmium red, and other various organic or inorganic dyes and pigments in order to color the compositions. In addition to the above colored pigments, the resin compositions can also contain a rust-proofing pigment such as zinc chromate, red lead, red iron oxide, zinc flower or strontium chromate, an anti-sag agent such as aluminum stearate, a dispersing agent, a thickener, a coat modifier, a body pigment or a fire retardant, which are known additives for paints.

The compositions of this invention are cured by heating after applying it to a substrate as a coating or adhesive layer, or after molding or laminating in the form of powder, pellet or as impregnated in a substrate. The curing conditions of the curable composition of this invention depend on the proportion of components constItuting the composition and the nature of the components employed. In general, the composition of this invention may be cured by heating it at temperature within the range of about 0°–300° C., preferably about 100° C.–250° C., although differing according to the presence of a catalyst or curing agent or its amount, or the types of the components in the composition. The time required for heating is generally 30 seconds to 10 hours, although considerably differing according to whether the resin composition is used as a thin coating or as molded articles of relatively large thickness or as laminates or as matrix resins for fiber reinforced composites, particularly for electrical and electronic applications, e.g., when applied to an electrically conductive material, such as copper, and subsequently cured. Suitable fibrous reinforcing materials include glass fibers, quartz fibers, carbon fibers, boron fibers, Kevlar fibers, Teflon ® fibers (polytetrafluoroethylene) and the like, fibers with woven or continuous glass fibers or carbon fibers being preferred. The fibrous or reinforcing material is present in the composition in an amount effective to impart increased strength to the composition for the intended purpose, generally from about 40 to about 95 weight percent, usually from about 50 to about 80 weight percent, based on the weight of the total composition. The laminates o: the invention can optionally include one or more layers of a different material and in electrical laminates this includes one or more layers of a conductive material such as copper or the like. When the resin composition of this invention is used for producing molded articles, laminated articles or bonded structures, the curing is desirably effected under pressure. Generally, this pressure is from 10 to 100 Kg/cm$^2$ (gauge).

The composition of this invention cures rapidly, even under mild conditions, so is especially suitable when quantity production and ease of workability are desired. The cured resin made from the composition not only has excellent adhesive force, bond strength, heat resistance, and electric properties, but also is excellent in mechanical properties and resistance to impact, chemicals, moisture and the like. The composition of this invention has a variety of uses as a coating material for rust prevention, flame resistance, flame retardance and the like; as electrical insulating varnish; as adhesive; in laminates to be used for furnitures, building materials, sheathing materials, electrical insulating materials, and the like; and in a variety of moldings.

ILLUSTRATIVE EMBODIMENTS

The present invention is further illustrated by the following examples which are not intended to be construed as limitations upon the invention.

EMBODIMENT 1

Preparation of Dicyanate Ester of Bisphenol A

A five-liter, four-neck flask equipped with a stirrer, thermocouple and addition funnel was charged with 314.5 g of cyanogen bromide followed by 985.8 g of isopropyl alcohol. The mixture was chilled to $-50°$ C. to 3° C. and a mixture of 456 g of bisphenol A and 420.16 g of triethylamine dissolved in 2135.7 g of isopropyl alcohol was added with stirring over 120 minutes while maintaining the reaction temperature at $-5°$ C. to 3° C. The mixture was stirred overnight. The desired dicyanate ester product and triethylamine hydrobromide salt crystallized out of the solution together. The resulting slurry was filtered using a vacuum Buchner funnel. The filtered solids were allowed to warm to room temperature and then washed with deionized water until triethylamine hydrobromide was removed from the desired solid dicyanate ester product. The solids were dried in a vacuum oven at 120° F. to give 270 g of the desired dicyanate ester of bisphenol A, m. p. about 55° C.

EMBODIMENT 2

Preparation of Dipropargyl Ether of Bisphenol A

A mixture of 300 g of bisphenol A in 1039.4 g of isopropyl alcohol (IPA) was mixed with a mixture of 112.8 g of 97% sodium hydroxide in 942.1 of deionized water and heated to 135° F. to obtain a clear solution. To thIs solution was added over ½ hour 500.1 g of 98% propargyl chloride while heating to 150-155° F. (just below reflux). The pH of the reaction mixture was maintained by adding a sufficient number of 5 ml increments of a solution of 10% sodium hydroxide in deionized water to maintain the PH of the reaction mixture at greater than or equal to 12.

During the reaction, the desired propargyl ether crystallized out of solution. After six hours of reaction, the product was recovered by allowing (he reaction mixture (slurry) to cool to room temPerature, and vacuum filtering through a Buchner funnel. The product, the retained solids, were washed with water and filtered. This washing was repeated until the pH of the water after washing was equal to the pH before washing (usually 5.5–7). After water washing, the crystals were washed with IPA to remove any residual propargyl chloride and water. The crystals were dried under vacuum at 40–50° C. to produce about 300 grams of the final crystallized dipropargyl ether of bisphenol A, m. p.$=86.8°$ C.

EMBODIMENT 3

Dipropargyl Ether of Bisphenol A Blends with Dicyanate Ester of Bisphenol A and Laminates Therefrom Varnish formulations were prepared by mixing together the dipropargyl ether of bisphenol A with the dicyanate ester of bisphenol A (50—50% w) in acetone and dimethylformamide. Sufficient zinc octoate as a 10% weight solution in acetone was added to catalyze the cure. The resulting formulation was applied to coat glass cloth. The wet, coated glass cloth was dried in an oven to give a dried and partially reacted (advanced) resin coating, which was dry to the touch. Several sheets of the prepreg were then stacked and pressed with copper foil under heat and pressure to form copper clad electrical laminates.

Table 1 lists processing conditions for making the prepreg and the laminate.

TABLE 1

| Dipropargyl Ether and Dicyanate of BPA Blends | |
|---|---|
| Varnish | |
| Formulation, % W | Solid |
| DPEBPA[1] | 18 |
| DCyBPA[2] | 18 |
| Acetone | 10.8 |
| Dimethylformamide | 4.63 |
| Zinc Octoate, 8% (10% W in Acetone) | 0.23 |
| Gel Time, Seconds at 171° C. | 82 |
| Prepreg | |
| Glass Style | 7628 |
| Processing Conditions | |
| Oven Time, Minutes | 4.0 |
| Oven Temperature, °C. | 163 |
| Resin Content, % W | 41 |
| Lamination | |
| Laminate Construction: Size, in. × in.: 4 × 4 No. of Plies: 8 | |
| Processing Conditions | |
| Heat-up rate, °F./Minutes | 75-380/8 |
| Temperature, °F. | 380 |
| Time at Temperature, Hours | 1.5 |
| Pressure, psi | 250 |
| Post Cure at Temperature, °F./Hours | 220/3 |
| | 250/1 |
| Glass Transition | |
| Temperature, °C. (Tg) DSC[3] | 190.56 |
| DMA[4] Damping Peak - Max, °C. | 244 |
| Coefficient of Thermal (CTE) | |
| Expansion, ppm/°C. | |
| Below Tg | 46.5 |
| Average, 50–250° C. | 91.5 |
| TGA[5] 5% Weight Loss, Temperature, °C. | 390.48 |
| Residual @ 500° C. | 85.17% |
| % Water After 24 Hours | 0.5% |

[1]Dipropargyl ether of bisphenol A.
[2]Dicyanate (cyanate ester) of bisphenol A.
[3]Differential Scanning Calorimeter.
[4]Dynamic Mechanical Analyzer.
[5]Thermogravimetric analyses.

What is claimed is:

1. A curable resin composition comprising
   (a) a cyanate aromatic ester monomer, prepolymers thereof or prepolymers of the ester monomer and an amine; and
   (b) a propargyl aromatic ether monomer.

2. A composition according to claim 1 wherein (a) is a dicyanate aromatic ester of a dihydric phenol, or is a prepolymer thereof or a prepolymer of the ester and an amine.

3. A composition according to claim 2 wherein (a) is a dicyanate ester of bisphenol A or a prepolymer thereof or a prepolymer of the ester and an amine.

4. A composition according to claim 3 wherein (a) is a prepolymer.

5. A composition according to claim 1 wherein (b) is a dipropargyl ether of a dihydric phenol.

6. A composition according to claim 5 wherein (b) is a dipropargyl ether of bisphenol A.

7. A composition according to claim 1 wherein the ratio by weight of component (a) to component (b) is in the range 70:30 to about 30:70.

8. A composition according to claim 7 wherein the ratio by weight of component (a) to component (b) is in the range of 70:30 to 40:60.

9. A composition according to claim 8 wherein the ratio by weight of component (a) to component (b) is 50:50.

10. A composition according to claim 1 wherein (a) is a dicyanate aromatic ester of a dihydric phenol, a prepolymer thereof or a prepolymer of the ester monomer and an amine; and (b) is a dipropargyl aromatic ether of a dihydric phenol.

11. A composition according to claim 10 wherein (a) is a dicyanate ester of bisphenol A, a prepolymer thereof or a prepolymer of the ester and an amine, and (b) is a dipropargyl ether of bisphenol A.

12. A composition according to claim 11 wherein (a) is a prepolymer.

13. A composition according to claim 11 wherein the ratio by weight of component (a) to component (b) is in the range of 70:30 to 40:60.

14. A composition according to claim 13 wherein the ratio of (a) to (b) is 50:50.

15. A cured composition comprising a composition of claim 1 which has been cured in the presence of a curing agent.

16. A composition according to claim 15 wherein the curing agent is zinc octoate.

17. A laminating composition comprising a composition of claim 1.

18. A process of preparing a cured resin which comprises treating a composition according to claim 1 with a curing agent.

19. A process according to claim 18 wherein the composition is in one in which (a) is a dicyanate of bisphenol A, a prepolymer thereof or a prepolymer and an amine, and (b) is a dipropargyl ether of bisphenol A.

20. A process according to claim 19 wherein the curing agent is zinc octoate.

* * * * *